(12) United States Patent
Arai

(10) Patent No.: US 10,040,355 B2
(45) Date of Patent: Aug. 7, 2018

(54) ELECTRIC POWER SUPPLY SYSTEM

(71) Applicant: TOYOTA JIDOSHA KABUSHIKI KAISHA, Toyota-shi, Aichi-ken (JP)

(72) Inventor: Kunihiko Arai, Owariasahi (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 182 days.

(21) Appl. No.: 15/073,750

(22) Filed: Mar. 18, 2016

(65) Prior Publication Data

US 2016/0276935 A1    Sep. 22, 2016

(30) Foreign Application Priority Data

Mar. 19, 2015   (JP) .................................. 2015-055901

(51) Int. Cl.
*B60L 3/00*    (2006.01)
*B60L 11/18*    (2006.01)

(52) U.S. Cl.
CPC ......... *B60L 3/0023* (2013.01); *B60L 11/1803* (2013.01); *B60L 11/1872* (2013.01); *Y02T 10/7005* (2013.01); *Y10S 903/904* (2013.01)

(58) Field of Classification Search
CPC .................... Y10S 903/904; Y02T 10/7005
See application file for complete search history.

(56) References Cited

U.S. PATENT DOCUMENTS

| | | | | |
|---|---|---|---|---|
| 5,929,762 A * | 7/1999 | Missimer, Jr. | ......... | G08B 17/00 340/584 |
| 7,127,337 B2 * | 10/2006 | Bennett | .................. | B60K 6/445 180/65.1 |
| 7,686,853 B2 * | 3/2010 | Seman, Jr. | ............ | H01M 2/204 29/623.1 |
| 2008/0174274 A1 * | 7/2008 | Kosaka | .................. | H02J 7/0016 320/117 |
| 2010/0297483 A1 | 11/2010 | Kawai | | |
| 2012/0021263 A1 * | 1/2012 | Nishi | .................. | B60L 11/1851 429/62 |
| 2012/0242291 A1 | 9/2012 | Kimura | | |
| 2013/0249495 A1 * | 9/2013 | Ang | ........................ | H02J 7/047 320/134 |
| 2015/0047947 A1 * | 2/2015 | Tait | .......................... | B60S 5/06 198/339.1 |

(Continued)

FOREIGN PATENT DOCUMENTS

| CN | 102870272 A | 1/2013 |
|---|---|---|
| JP | 2005-072198 A | 3/2005 |
| JP | 2005-073392 A | 3/2005 |

(Continued)

*Primary Examiner* — Thienvu Tran
*Assistant Examiner* — Pinping Sun
(74) *Attorney, Agent, or Firm* — Sughrue Mion, PLLC

(57) ABSTRACT

A converter can selectively use reactors through an ON-OFF control on relays by an electronic control unit. The first reactor is disposed as a component of the converter separately from a main battery. On the other hand, the second reactor is so disposed as to have a heat transfer path between the second reactor and the main battery. At least based on the output from the temperature sensor, in a low temperature state of the main battery, the electronic control unit turns off the first relay, and turns on the second relay, thereby configuring a reactor of the converter by using the second reactor.

9 Claims, 11 Drawing Sheets

(56) References Cited

U.S. PATENT DOCUMENTS

2015/0295514 A1* 10/2015 Yamagami .......... B60L 11/1861
363/98
2015/0321577 A1* 11/2015 Murata ................. H02J 7/1438
320/153

FOREIGN PATENT DOCUMENTS

| | | | | |
|---|---|---|---|---|
| JP | 2006-351653 A | 12/2006 | | |
| JP | 2008220130 A * | 9/2008 | ................ | B60L 7/14 |
| JP | 2009-004237 A | 1/2009 | | |
| JP | 2010-97923 A | 4/2010 | | |
| JP | 2010-182511 A | 8/2010 | | |
| JP | 2010-259220 A | 11/2010 | | |
| JP | 2011-003288 A | 1/2011 | | |
| JP | 2011-205806 A | 10/2011 | | |
| JP | 2012-69495 A | 4/2012 | | |
| JP | 2012-69496 A | 4/2012 | | |
| JP | 2013-145689 A | 7/2013 | | |
| JP | 5392407 B2 | 1/2014 | | |
| JP | 2014-87081 A | 5/2014 | | |
| JP | 2014087081 A * | 5/2014 | ................ | H02J 7/00 |
| WO | 2011/004464 A1 | 1/2011 | | |
| WO | 2012/147137 A1 | 11/2012 | | |

* cited by examiner

ELECTRIC POWER SUPPLY SYSTEM

INCORPORATION BY REFERENCE

The disclosure of Japanese Patent Application No. 2015-055901 filed on Mar. 19, 2015 including the specification, drawings and abstract is incorporated herein by reference in its entirety.

BACKGROUND OF THE INVENTION

1. Field of the Invention

The present invention relates to an electric power supply system, and more particularly to an electric power supply system equipped with an electric power storage apparatus and a converter that including a reactor.

2. Description of Related Art

An electric power supply system equipped with an electric power storage apparatus and a converter including a reactor and switching elements is described in Japanese Patent Application Publication No. 2014-87081.

In JP 2014-87081 A, the converter is configured such that a first reactor and a second reactor that have different inductances are switched via a relay. In addition, it is described that during increasing the temperature of the electric power storage apparatus by Joule heat due to supply of a ripple current, current is supplied to the second reactor having a smaller inductance than that of the first reactor used in the vehicle drive. Through this, it is possible to promote effect to increase the temperature of the electric power storage apparatus by increasing an amplitude of the ripple current.

Unfortunately, there is room for improvement of energy efficiency in the configuration of JP 2014-87081 A because, from energy of passing current of the electric power storage apparatus, only heat generated due to the Joule heat from an inside of the electric power storage apparatus can be used for increasing the temperature of the electric power storage apparatus.

In general, a reactor of a converter is disposed close to switching elements. Hence, it is necessary to consider that the switching elements are prevented from having an excessively high temperature due to heat generated by passing current through the reactor during increasing temperature of an electric power storage apparatus. In light of this point, there is a concern that during increasing the temperature of the electric power storage apparatus, the current is restricted.

As aforementioned, it is appreciated that in the configuration of JP 2014-87081 A, there is room for improvement in efficient and rapid temperature increasing of an electric power storage apparatus in a low temperature state.

SUMMARY OF THE INVENTION

The present invention provides an electric power supply system equipped with an electric power storage apparatus and a converter including a reactor, and the electric power supply system is capable of efficiently and rapidly increasing temperature of the electric power storage apparatus in a low temperature state.

In an aspect of the present invention, an electric power supply system includes: an electric power storage apparatus; a detector configured to detect a temperature state of the electric power storage apparatus; a converter including a first reactor and switching elements; a second reactor; a first switch and a second switch; and an electronic control unit. The converter is connected between the electric power storage apparatus and a load. The first switch is electrically connected to the first reactor in series relative to the electric power storage apparatus. The second reactor is so disposed as to have a heat transfer path between the second reactor and the electric power storage apparatus. The second switch is electrically connected to the second reactor in series relative to the electric power storage apparatus. The electronic control unit is configured to control the converter, the first switch, and the second switch. The second reactor and the second switch are electrically connected to the first reactor and the first switch in parallel relative to the electric power storage apparatus. Based on an output from the detector, the electronic control unit is configured to close the second switch, and open the first switch in a low temperature state of the electric power storage apparatus.

According to the above electric power supply system, if the electric power storage apparatus is in the low temperature state, the reactor of the converter can be configured by the second reactor having the heat transfer path between the second reactor and the electric power storage apparatus. Accordingly, it is possible to increase the temperature of the electric power storage apparatus, at the time of sending current to the electric power storage apparatus by the converter, by using amount of heat generated in the second reactor due to the current well as amount of heat generated by internal resistance in the electric power storage apparatus. Accordingly, it is possible to efficiently and rapidly increase the temperature of the electric power storage apparatus in the low temperature state.

Preferably, the second reactor may be disposed in a housing that houses the electric power storage apparatus thereinside. Through this configuration, the amount of heat generated in the second reactor can effectively transferred to the electric power storage apparatus.

Preferably, the electric power supply system may be installed in a vehicle. The electric power storage apparatus is configured to be charged via a current path including the converter when the electric power storage apparatus is charged by electric power from an electric power supply in an outside of the vehicle.

Through this configuration, at the time of charging the electric power storage apparatus installed in the vehicle by using the converter with the electric power from the electric power supply in the outside of the vehicle, it is possible to use the amount of heat generated in the second reactor of the converter for increasing the temperature of the electric power storage apparatus. Accordingly, at the time of externally charging the vehicle-installed electric power storage apparatus, it is possible to efficiently and rapidly increase the temperature of the electric power storage apparatus in the low temperature state.

Preferably, in the low temperature state of the electric power storage apparatus, the electronic control unit may be configured to control ON-OFF of the switching elements of the converter in such a manner that charge or discharge current of the electric power storage apparatus becomes alternating current having an average value of zero.

Through this configuration, in the control (ripple temperature increasing control) on the converter to generate alternating current for increasing the temperature of the electric power storage apparatus, amount of heat generated in the second reactor of the converter is used for increasing the temperature of the electric power storage apparatus, thereby efficiently and rapidly increasing the temperature of the electric power storage apparatus.

Preferably, the electric power supply system may be installed in the vehicle. During the drive of the vehicle, if abnormality occurs in the first reactor, the electronic control unit may be configured to close the second switch, and open the first switch in the low temperature state of the electric power storage apparatus.

Through this configuration, even if abnormality occurs in the first reactor, the second reactor is used as a substitute reactor so as to maintain the drive of the vehicle.

In addition, the electric power supply system may preferably be installed in a hybrid vehicle equipped with an engine and a motor. The electronic control unit may be configured to close the second switch, and open the first switch in a drive condition in which silence is required for the hybrid vehicle.

Through this configuration, if the hybrid vehicle is in the drive condition in which silence is required, the reactor of the converter is configured by using the second reactor housed inside the housing of the electric power storage apparatus, thereby reducing noises to be perceived from the outside of the vehicle.

Furthermore, even in the drive condition in which silence is required for the hybrid vehicle, the electronic control unit may preferably be configured to close the first switch, and open the second switch if the electric power storage apparatus is in a high temperature state.

Through this configuration, while the electric power storage apparatus is prevented from being in an excessively high temperature state, it is possible to cope with the drive condition in which silence is required, or a trouble in the first reactor.

Preferably, the electric power storage apparatus may include a plurality of battery cells each of which has a cylindrical shape. The battery cells may be fixed into a plurality of holes formed in a thermal diffusing plate in a flat-plate shape. The second reactor may be so disposed as to have a heat transfer path between the second reactor and the thermal diffusing plate.

Through this configuration, during increasing the temperature of the electric power storage apparatus with the operation of the converter using the second reactor, amount of heat generated by the second reactor can be transferred via the thermal diffusing plate to each battery cell. Accordingly, it is possible to suppress variation in temperature among the battery cells, thus attaining uniform temperature increasing of the electric power storage apparatus.

Preferably, the battery cells configuring the electric power storage apparatus may be separately arranged in a plurality of electric-power-storage-apparatus units. The second reactor may include a plurality of reactor elements connected in series. The reactor elements may be so arranged as to have respective heat transfer paths between the reactor elements and the electric-power-storage-apparatus units.

Through this configuration, during increasing the temperature of the electric power storage apparatus with the operation of the converter using the second reactor, it is possible to suppress variation in temperature among the battery cells separately arranged in the units, thereby attaining uniform temperature increasing of the electric power storage apparatus.

Preferably, the first reactor and the second reactor have an equal inductance. Through this configuration, at the time of performing switching between the first reactor and the second reactor by controlling the first switch and the second switch, it is possible to stabilize the operation of the converter before and after the switching.

According to the above aspect of the present invention, in an electric power supply system equipped with an electric power storage apparatus and a converter including a reactor, it is possible to efficiently and rapidly increase a temperature of the electric power storage apparatus in a low temperature state.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
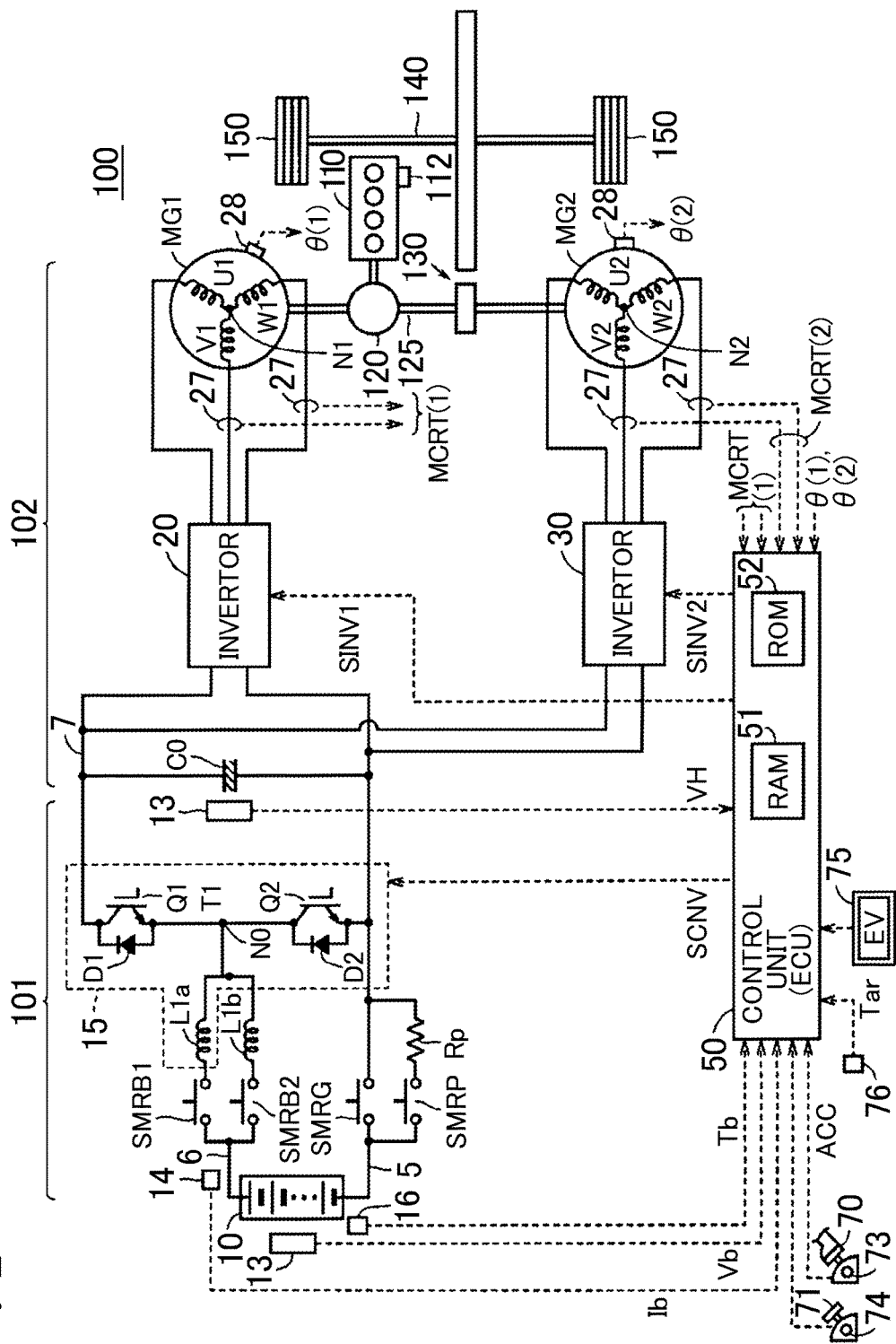
FIG. 1 is a block diagram explaining a configuration example of a hybrid vehicle to which an electric power supply system according to an embodiment of the present invention is applied.

Hereinafter, embodiments of the present invention will be described in details with reference to drawings. In the following drawings, the same reference numerals are used for common or equivalent elements, and overlapping description thereof will be basically omitted.

First Embodiment

FIG. 1 is a block diagram explaining a configuration example of a hybrid vehicle to which an electric power system according to an embodiment of the present invention is applied.

With reference to FIG. 1, the hybrid vehicle 100 includes an engine 110, a power-split mechanism 120, motor generators MG1, MG2, a reduction gear 130, a driving shaft 140, and wheels (driven wheels) 150.

The engine 110 is configured by an internal combustion engine, such as a gasoline engine and a diesel engine, for example. The engine 110 is equipped with a cooling-water temperature sensor 112 detecting a temperature of a cooling water. An output of the cooling-water temperature sensor 112 is transmitted to a control unit 50.

The power-split mechanism 120 is configured to split power generated by the engine 110 into a path to the driving shaft 140 and into a path to the motor generator MG1. As the power-split mechanism 120, a planetary gear mechanism having respective three rotation axes of a sun gear, a planetary gear, and a ring gear may be used.

For example, it may be configured that a rotor of the motor generator MG1 is formed to be hollow, and a crank shaft of the engine 110 is disposed through the center of this rotor, thereby mechanically connecting the engine 110 and the motor generators MG1, MG2 respectively to the power-split mechanism 120. Specifically, the rotor of the motor generator MG1 is connected to the sun gear, an output shaft of the engine 110 is connected to the planetary gear, and an output shaft 125 is connected to the ring gear. The output shaft 125 also connected to a rotation shaft of the motor generator MG2 is connected to a driving shaft 140 for rotationally driving the wheels 150 via the reduction gear 130. A reduction gear for the rotation shaft of the motor generator MG2 may further be incorporated.

Each of the motor generators MG1, MG2 is configured by a three-phase motor. The motor generator MG1 includes a U-phase coil winding U1, a V-phase coil winding V1, a W-phase coil winding W1 that are disposed to a stator, and a not-shown rotor. The motor generator MG2 has the same configuration as that of the motor generator MG1, and includes a U-phase coil winding U2, a V-phase coil winding V2, and a W-phase coil winding W2 that are disposed to a stator, and a not-shown rotor.

The motor generator MG1 is configured to have both functions as a motor and an electric power generator so as to behave as an electric power generator driven by the engine 110, and also behave as a motor to start up the engine 110. Similarly, the motor generator MG2 is incorporated in the hybrid vehicle 100 via the output shaft 125 and the reduction gear 130 so as to transmit an output thereof to the driving shaft 140. In addition, the motor generator MG2 is configured to have both functions as a motor and an electric power generator so as to carry out electric power regeneration by generating an output torque in a direction reverse to a rotational direction of the wheels 150.

In this manner, the motor generators MG1, MG2 and the output shaft of the engine 110 are connected to one another via the power-split mechanism 120. Accordingly, the hybrid vehicle 100 is configured to drive by selecting a drive mode using only the output from the motor generator MG2 with the engine 110 stopped (hereinafter, also referred to as an "EV drive"), or a drive mode along with operation of the engine 110 (hereinafter, also referred to as an "HV drive").

In the HV drive, the output of the engine 110 is used via the power-split mechanism 120 for the vehicle drive by rotation of the driving shaft 140 and or power generation by the motor generator MG1.

The hybrid vehicle 100 includes invertors 20, 30, a smoothing capacitor C0, the control unit 50, and a power supply system 101 including an electric power storage apparatus and a converter, and these components are used for drive-controlling the motor generators MG1, MG2. An electrical load 102 to the power supply system 101 is configured by the smoothing capacitor C0, the invertors 20, 30, and the motor generators MG1, MG2.

The power supply system 101 includes a main battery 10 provided as a representative example of the "electric power storage apparatus", relays SMRB1, SMRB2, SMRG, SMRP, and a converter 15.

The main battery 10 is typically configured by a secondary battery of nickel metal hydride, Lithium ion, or the like. A battery voltage Vb outputted from the main battery 10 is detected by a voltage sensor 13, and a battery current Ib inputted to or outputted from the main battery 10 is detected by a current sensor 14. The main battery 10 is equipped with a temperature sensor 16. The battery voltage Vb, the battery current Ib, and a battery temperature Tb respectively detected by the voltage sensor 13, the current sensor 14, and the temperature sensor 16 are outputted to the control unit 50.

The converter 15 is configured by a so-called bidirectional chopper, and includes a reactor $L1a$ and power semiconductor devices (hereinafter, referred to as "switching elements") Q1, Q2 that are switching-controlled. The reactor $L1a$ is connected between a connection node N0 of the power semiconductor devices Q1, Q2 and the main battery 10 via an electric power line 6.

The semiconductor devices Q1, Q2 are connected in series between an electric power line 7 and an electric power line 5. ON-OFF of the semiconductor devices Q1, Q2 are controlled by a switching control signal SCNV from the control unit 50. In the present embodiment, as the switching element, an IGBT (insulated gate bipolar transistor), a power MOS (metal oxide semiconductor) transistor, a power bipolar transistor, or the like may be used. Antiparallel diodes D1, D2 are respectively disposed to the semiconductor devices Q1, Q2, Respective DC voltage sides of the invertors 20 and 30 are connected to the converter 15 via the electric power line 5 located on a high voltage side and the electric power line 7 located on a low voltage side. The electric power lines 5 and 7 are common to the invertors 20 and 30. Each of the invertors 20 and 30 is a general three-phase invertor configured by a plurality of not-shown switching elements; therefore detailed description of a configuration thereof will be omitted.

One end of each phase coil winding U1, V1, W1 of the motor generator MG1 is connected to each corresponding phase arm (not shown) of the invertor 20, and the other end thereof is connected to one another at a neutral point N1. Similarly, one end of each phase coil winding U2, V2, W2 of the motor generator MG2 is connected to each corresponding phase arm (not shown) of the invertor 30, and the other end thereof is connected to one another at a neutral point N2.

Current sensors 27 and an angle-of-rotation sensor (resolver) 28 are respectively disposed to each motor generator MG1, MG2. The sum of respective instantaneous values of the three phase currents is zero; therefore, as shown in FIG. 1, it is sufficient that the current sensors 27 are so disposed as to detect motor currents by only two phases. Each angle-of-rotation sensor 28 detects an angle of rotation $\theta$ of each not-shown rotor of each corresponding motor generator MG1, MG2. A motor current MCRT (1) and the angle of rotation $\theta$ (1) of the motor generator MG1, and a motor current MCRT (2) and the angle of rotation $\theta$ (2) of the motor generator MG2, which are detected by the above sensors, are outputted to the control unit 50.

The invertor 20 carries out a dual directional DC/AC power conversion through an ON-OFF control (switching control) on the switching elements (not shown) in response to a switching control signal SINV1 from the control unit 50. At the same time, the invertor 30 carries out a dual directional DC/AC power conversion through an ON-OFF control (switching control) on the switching elements (not shown) in response to a switching control signal SINV2 from the control unit 50, as similar to the invertor 20.

The configuration of the power supply system 101 will be described as follows. The main battery 10 and the converter 15 are connected to each other via the electric power line 5 and the electric power line 6. A relay SMRB1 is connectively interposed in the electric power line 6. The relay SMRB1 is electrically connected to the reactor L1a in series relative to the main battery 10. A relay SMRG is connectively interposed in the electric power line 5. A relay SMRP and a limiting resistor Rp connected in series are disposed in parallel with the relay SMRG.

The power supply system 101 further includes a reactor L1b and a relay SMRB2 that are electrically connected in series relative to the main battery 10. The reactor L1b and the relay SMRB2 are electrically connected to the reactor L1a and the relay SMRB1 in parallel relative to the main battery 10.

These relays SMRB1, SMRB2, SMRG, SMRP are closed (ON) or opened (OFF) in response to a command from the control unit 50. For example, in order to control inrush current at the time of starting up the power supply system 101, the relays SMRG, SMRP are controlled such that after the relay SMRP is turned on (the relay SMRG is turned off) in a certain time period, the relay SMRP is turned off, and the relay SMRG is turned on. The ON-OFF control on the relays SMRB1, SMRB2 will be described in details later.

In the configuration example of FIG. 1, the reactor L1a is correspondent to a "first reactor", and the reactor L1b is correspondent to a "second reactor". The relay SMRB1 is correspondent to a "first switch", and the relay SMRB2 is correspondent to a "second switch". The relay arrangement in the configuration example of FIG. 1 may be changed in such a manner that the reactors L1a, L1b and the relays SMRB1, SMRB2 are connectively interposed in the electric power line 5, and the relays SMRG, SMRP, and the limiting resistor Rp are connectively interposed in the electric power line 6.

The control unit 50 configured by an electronic control unit (ECU) is configured to include a microcomputer (not shown), a RAM (random access memory) 51, and a ROM (read only memory) 52. The control unit 50 controls operation of various equipment of the hybrid vehicle 100 in accordance with predetermined program processing previously stored in the ROM 52. Alternatively, at least part of the control unit 50 is configured to execute predetermined numerical and logical operation by hardware, such as an electronic circuit.

As data regarding the main battery 10, the battery voltage Vb, the battery current Ib, and the battery temperature Tb are inputted to the control unit 50. Based on the above data, the control unit 50 calculates an input-power upper limit value Win indicating a charging rate (SOC: state of charge) and an output-power upper limit value Wout indicating a charge-discharge limit. The control unit 50 has a power management function to appropriately restrict electric power consumption and electric power generation (electric power regeneration) by the motor generators MG1, MG2 so as not to cause overcharging or overdischarging of the main battery 10.

As is well known, a deceleration or stop command from a driver to the hybrid vehicle 100 is inputted by operation of an accelerator pedal 70 or a brake pedal 71. Amount of operation ACC of the accelerator pedal 70 by the driver is detected by an accelerator position sensor 73. Similarly, amount of operation BRK of the brake pedal 71 is detected by a brake-pedal input-amount sensor 74. The respective detected mount of operations ACC and BRK are inputted to the control unit 50.

An EV-drive switch 75 and an outside-air-temperature sensor 76 are also disposed in the hybrid vehicle 100. The outside-air-temperature sensor 76 detects an outside-air temperature Tar outside the hybrid vehicle 100. The detected outside-air temperature Tar is transmitted to the control unit 50.

The EV-drive switch 75 is operated when the driver wants to select the EV drive. When the EV-drive switch 75 is operated, the control unit 50 selects the EV drive if a predetermined condition is satisfied (the SOC of the main battery 10 is secured to be a predetermined value or more, for example).

The control unit 50 controls the outputs of the engine 110 and the motor generators MG1, MG2 so as to bring the hybrid vehicle 100 to appropriately accelerate or decelerate in accordance with accelerating or braking operation of the driver. As part of the above drive control, selection between the EV drive and the HV drive is executed, as aforementioned.

For example, during a low-speed drive in which an engine drive is in a low fuel consumption region, the EV drive with the engine 110 stopped can be selected. The EV drive is excellent in silence because noises outputted to circumstances of the vehicle become smaller due to the engine stop. On the other hand, if power required in the entire hybrid vehicle 100 becomes increased, the engine 110 can be operated to select the HV drive. In the HV drive, while the rotational frequency of the engine 110 is fixed in a preferable region for fuel efficiency, an acceleration demand from the operation of the accelerator pedal 70 by the driver can be satisfied by increase in torque (increase in rotational frequency) of the motor generator MG2.

For the aforementioned drive control, the control unit 50 generates an operation command value for the engine 110 (e.g., torque and a rotational frequency) and an operation command value for each motor generator MG1, MG2 (e.g., a torque command value). The control unit 50 generates an operation command value for each motor generator MG1, MG2 such that the input-output electric power from the main battery 10 to each entire motor generator MG1, MG2 is restricted to be within a range from the input-power upper limit value Win to the output-power upper limit value Wout.

The control unit 50 generates switching control signals SCNV, SINV1, SINV2 for the switching control on the converter 15 and the invertors 20, 30 so that the motor generators MG1, MG2 operate in accordance with the operation command value.

A switching control signal SCNV is generated for the power supply system 101 so as to appropriately control the voltage of the electric power line 7 for control on the motor generators MG1, MG2. Through this, the voltage ratio of the DC/DC conversion by the converter 15 is controlled. The converter 15 is configured as a dual-directional converter that can perform both a voltage-increasing operation to increase the voltage of the electric power line 6, and output this to the electric power line 7, and a voltage-decreasing operation to decrease the voltage of the electric power line 7, and outputs this to the electric power line 6.

In this manner, by drive-controlling each motor generator MG1, MG2 in accordance with the operation command value, it is possible to appropriately control generation of a vehicle drive force by electric power consumption in the motor generator MG2, generation of charged electric power of the main battery 10 by electric power generation in the motor generator MG1 or of electric power consumption in the motor generator MG2, and generation of charged electric power of the main battery 10 by regenerative braking operation (electric power generation) in the motor generator MG2, depending on the drive state of the vehicle.

As shown in FIG. 1, in the power supply system 101 in accordance with the present embodiment, by turning on or off the relays SMRB1, SMRB2, the two reactors L1a, L1b can be selectively used as the reactor of the converter 15.

Figure 2:
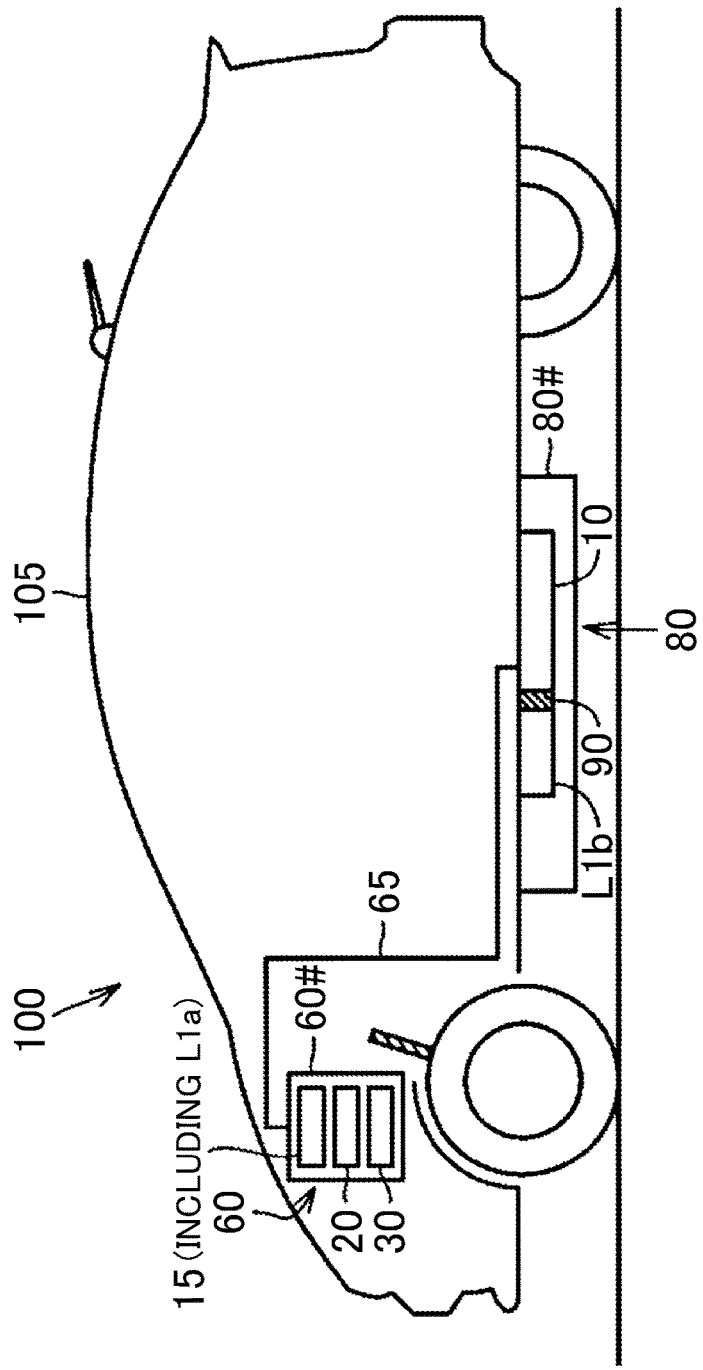
FIG. 2 is a conceptual diagram explaining arrangement locations of two reactors as shown in FIG. 1.

FIG. 2 is a conceptual diagram explaining the arrangement locations of the two reactors L1a, L1b as shown in FIG. 1.

With reference to FIG. 2, the converter 15 is disposed as a power control unit (PCU) 60 in which the converter 15 is integrated with the invertors 20, 30. The power control unit 60 is disposed in a space inside a body 105 (e.g., inside an engine compartment), for example. The reactor L1a is housed as a component of the PCU 60 in a housing 60# of the PCU 60.

In general, in the power control unit 60, there is a concern regarding heating of the switching elements configuring the converter 15 and the invertors 20, 30; therefore, each switching element is provided with a cooling structure including heat exhaust of the switching element to the outside of the housing 60#. Hence, it is preferable that the reactor L1a is also provided with the cooling structure to suppress heat radiation toward environmental components thereof.

Meanwhile, the main battery 10 is disposed as a battery pack 80 in which the battery cells configuring the main battery 10 and the sensors, etc. as shown in FIG. 1 are integrally configured, separately from the PCU. For example, the battery pack 80 is disposed in a region below a floor of a body 105.

The main battery 10 in the battery pack 80 is electrically connected to the converter 15 in the power control unit 60 via power cables 65. The electric power lines 5, 6 as shown in FIG. 1 may be configured by the power cables 65.

The reactor L1b is disposed inside a housing 80# of the battery pack 80. This means that the reactor L1b is disposed as a component of the battery pack 80. A specific arrangement example of the reactor L1b will be described later, and the reactor L1b is configured in a manner as to form a heat transfer path 90 between the reactor L1b and the main battery 10 (specifically, the battery cells configuring the main battery 10). For example, a physical contact between the reactor L1b and the main battery 10 defines the heat transfer path 90 therebetween.

Through this configuration, thermal energy of heat generated by the reactor L1b due to current passing therethrough is transferred to the main battery 10. Accordingly, at the time of current supply, the reactor L1b can increase the temperature of the main battery 10. Hereinafter, the reactor L1b is also referred to as a "reactor for temperature increasing". On the other hand, the reactor L1a is also referred to as a "normal reactor".

It has been known that charge-discharge performance of an electric power storage apparatus, such as a secondary battery, becomes deteriorated due to increase in internal resistance or the like in a low temperature state. Hence, the power supply system 101 according to the present embodiment efficiently and rapidly increases the temperature of the main battery 10 in the low temperature state by the switching control on the reactors L1a, L1b (hereinafter, referred to as a "reactor switching control") of the converter 15.

Figure 3:
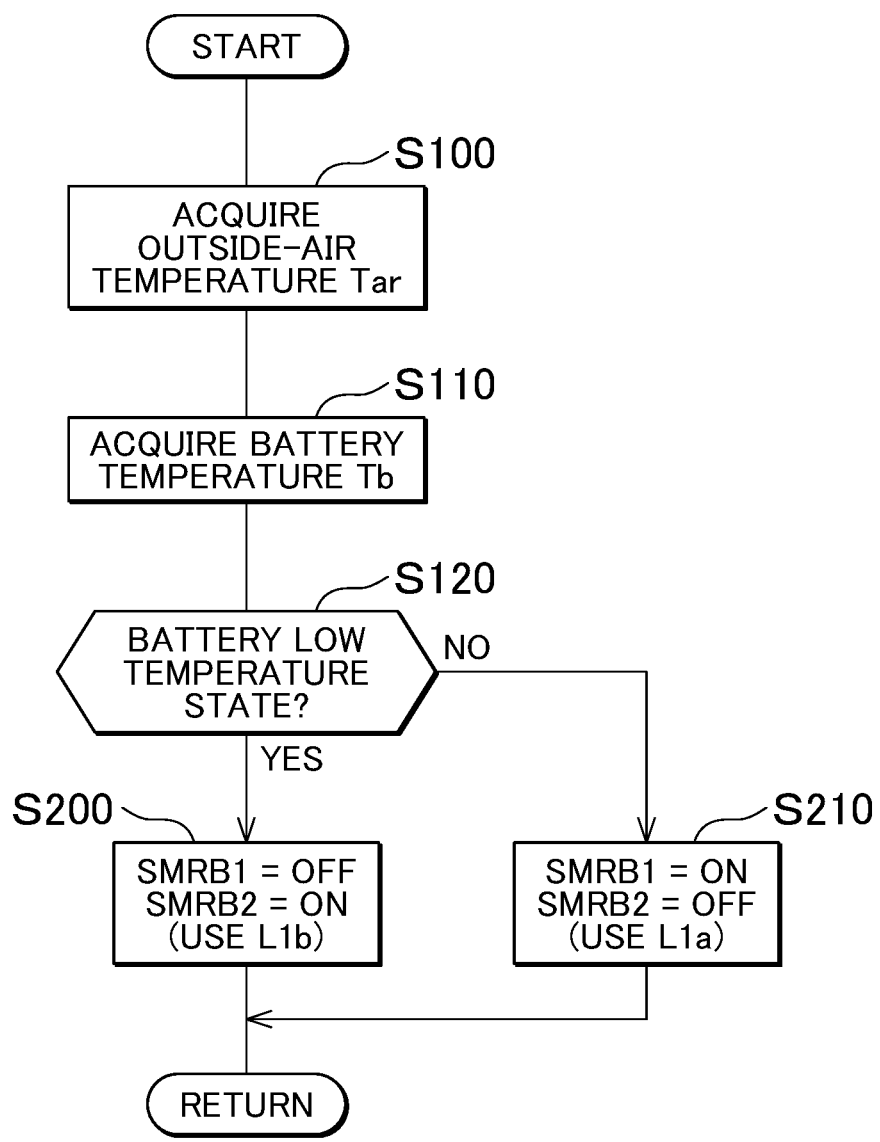
FIG. 3 is a flowchart explaining processing of a reactor switching control of a converter in the electric power supply system according to the embodiment.

FIG. 3 is a flowchart explaining processing of the reactor switching control of the converter in the electric power supply system according to the present embodiment. The control processing in accordance with the flowchart as shown in FIG. 3 is repetitively executed by the control unit 50 with predetermined time intervals.

With reference to FIG. 3, in step S100, the control unit 50 acquires the outside-air temperature Tar based on the output from the outside-air-temperature sensor 76. In step S110, the control unit 50 acquires the battery temperature Tb based on the output from the temperature sensor 16. In step S120, the control unit 50 determines where or not the main battery 10 is in the low temperature state.

Most simply stated, the determination in step S120 can be made by determining whether or not the battery temperature Tb acquired in step S110 is greater than a threshold value. Alternatively, based on both the outside-air temperature Tar acquired in step S100 and the battery temperature Tb, it is also possible to determine whether or not the main battery 10 is in the low temperature state. In this case, in a low-temperature environment having an outside air temperature lower than a predetermined temperature, if the battery temperature Tb is smaller than the threshold value, it can be determined that the main battery 10 is in the low temperature state. In other words, the temperature sensor 16 and or the outside-air-temperature sensor 76 correspond to the "detectors".

If the main battery 10 is in the low temperature state (battery low temperature state) (if YES is determined in S120), the control unit 50 advances the processing to step S200.

In step S200, the control unit 50 turns on the relay SMRB2, and turns off the relay SMRB1. Through this, the reactor of the converter 15 is configured by using the reactor for temperature increasing L1b disposed inside the battery pack 80.

On the other hand, if the battery is not in the low temperature state (specifically, the main battery 10 is in a battery non-low temperature state) (if NO is determined in S120), the control unit 50 advances the processing to step S210.

In step S210, the control unit 50 urns off the relay SMRB1, and also turns on the relay SMRB2. Through this, the normal reactor L1a can be used as the reactor of the converter in the battery non-low temperature state.

In this manner, in the electric power supply system according to the present embodiment, in the battery low temperature state in which the temperature of the main battery 10 is required to be increased, the reactor of the converter 15 is configured by the reactor for temperature increasing L1b forming the heat transfer path between the reactor L1b and the main battery 10.

Accordingly, during operation of the converter 15, it is possible to increase the temperature of the main battery 10 by using generated heat due to current passing through the reactor for temperature increasing L1b as well as the Joule heat from internal resistance due to passing current in the main battery 10.

On the other hand, in the non-low temperature state of the main battery 10, the reactor of the converter is configured by using the normal reactor L1a in the PCU 60, and thus it is possible to prevent the main battery 10 from having an excessively high temperature because of heat from the reactor.

Next, the operation of the converter 15 to increase the temperature of the main battery 10 in the battery low temperature state will be described.

As a first example, the temperature of the main battery 10 can be increased through a converter control (hereinafter, also referred to as a ripple temperature increasing control) that generates alternating current having an average value of zero (ripple current) for battery temperature increasing, as described in JP2014-87081 A. The ripple temperature increasing control is executed if the temperature of the main battery 10 is required to be increased, for example, if it is determined that the main battery 10 is in the low temperature state in step S120 of FIG. 3. Specifically, during the ripple temperature increasing control, the reactor of the converter 15 is configured by the reactor for temperature increasing L1$b$.

Figure 4:
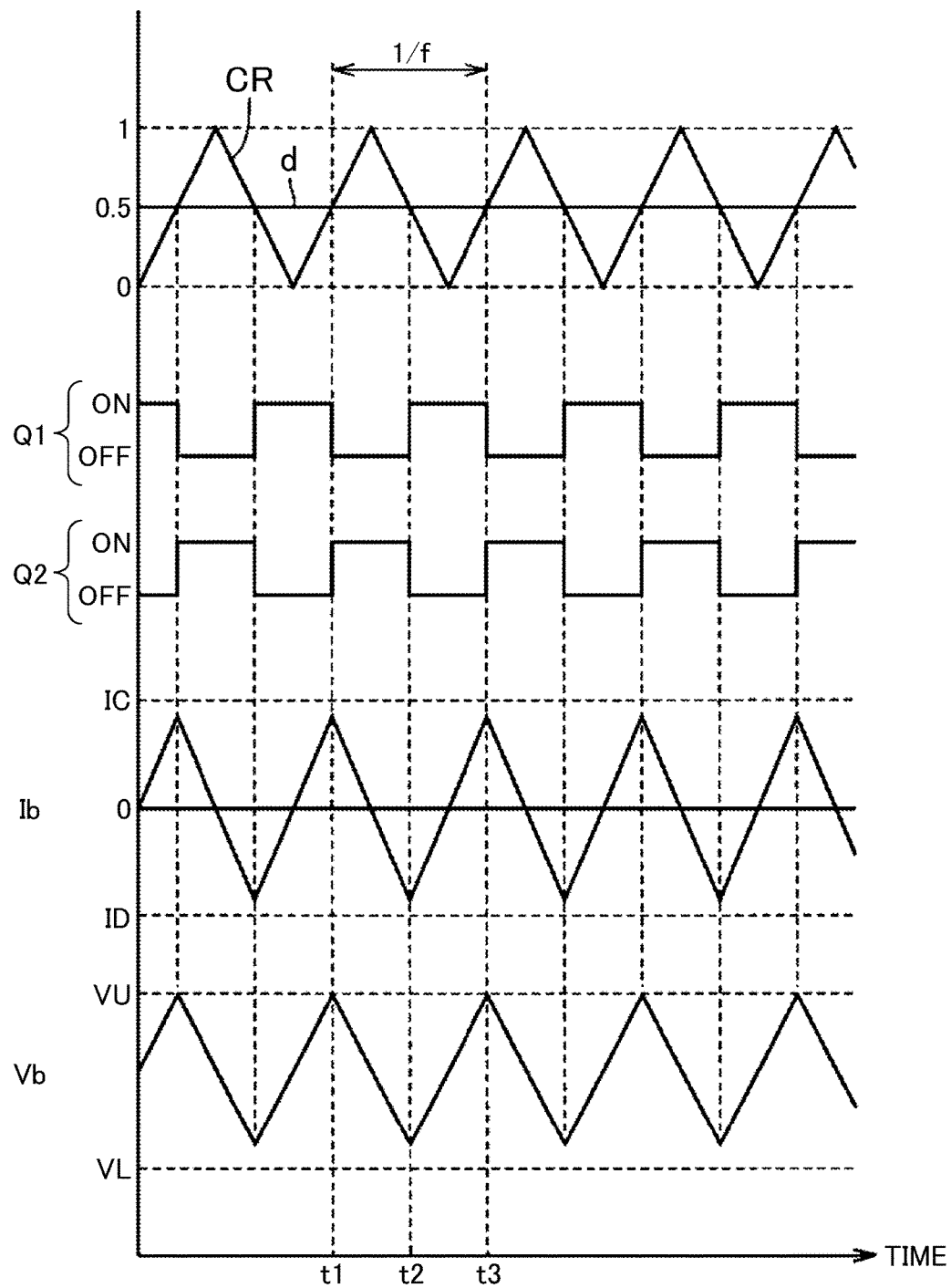
FIG. 4 is an operation waveform chart explaining a ripple temperature increasing control by the converter.

FIG. 4 is an operation waveform chart explaining the ripple temperature increasing control by the converter. The battery current Ib in FIG. 4 is represented in a positive value during charging, and in a negative value during discharging.

With reference to FIG. 4, ON-OFF of the switching elements Q1, Q2 of the converter 15 is PWM (pulse-width controlled)-controlled based on the comparison between a carrier signal CR formed by a pulse signal, such as a triangle wave, and a duty command value d. Specifically, in a period of CR>d, the switching element Q2 that is a lower arm element is turned on, and in a period of CR<d, the switching element Q2 is turned off. The switching element Q1 is complementarily turned on and off with the switching element Q2. The duty command value d is defined within a range of 0≤d<1. The duty command value d=1.0 is equivalent to a pulse amplitude (the maximum value–the minimum vale) of the carrier signal CR. In the normal converter control including the vehicle drive, the duty command value d is adjusted such that the voltage of the electric power line 7 coincides with a voltage command value.

During the ripple temperature increasing control, the frequency of the carrier signal CR in the above PWM control is preferably defined based on the frequency characteristics of impedance of the main battery 10. For example, a frequency region where an absolute value of the impedance is relatively decreased is previously found through on-site practical experiments or the like, and through this, it is possible to define the frequency of the carrier signal CR in the ripple temperature increasing control.

In addition, during the ripple temperature increasing control, the duty command value in the above PWM control is fixed to be d=0.5. If the carrier signal CR is greater than the duty command value d (=0.5) at a time t1 or the like, the switching element Q1 of the upper arm is turned off, and the switching element Q2 of the lower arm is turned on. An electric discharge path is then formed from the main battery 10 via the switching element Q1 and the reactor for temperature increasing L1$b$. Through this, the battery current Ib is turned to be increased to the negative direction (discharge direction). During the period of Ib<0, energy discharged from the main battery 10 is accumulated in the reactor for temperature increasing L1$b$. The battery voltage Vb becomes decreased during the ON-period of the switching element Q2 (lower arm) in which the main battery 10 is discharged.

At a time t2 or the like, if the carrier signal CR becomes smaller than the duty command value d (d=0.5), the switching element Q1 of the upper arm is turned on, and the switching element Q2 of the lower arm is turned off. The charging path of the main battery 10 by the energy accumulated in the reactor for temperature increasing L1$b$ during the ON-period of the lower arm is formed via the switching element Q2, the reactor for temperature increasing L1$b$, and the smoothing capacitor C0. Through this, the battery current Ib is turned to be increased to the positive direction (charge direction). The battery voltage Vb becomes increased during the ON-period of the switching element Q1 (upper arm) in which the main battery 10 is discharged.

At a time t3, when the carrier signal CR becomes greater than the duty command value d, the semiconductor devices Q1, Q2 are turned off and on, respectively, and the battery current Ib is turned to be increased to the negative direction again, and the battery voltage Vb becomes lowered.

In this manner, the switching elements Q1, Q2 are alternately turned on and off with a 50% duty cycle so that the battery current Ib and the battery voltage Vb vary in accordance with the frequency of the carrier signal CR. At this time, it is preferable to adjust the carrier frequency such that the battery current Ib and the battery voltage Vb stay within a constant range (for example, within a current range from IC to ID and a voltage range from VL to VU in FIG. 4).

Accordingly, during the ripple temperature increasing control, alternating current (ripple current) can be sent through the main battery 10 and the reactor for temperature increasing L1$b$. Through this, by heat from the internal resistance of the main battery 10 and heat generated by the reactor for temperature increasing L1$b$, it is possible to increase the temperature of the main battery 10 through internal heating and heat received from the outside.

Figure 5:
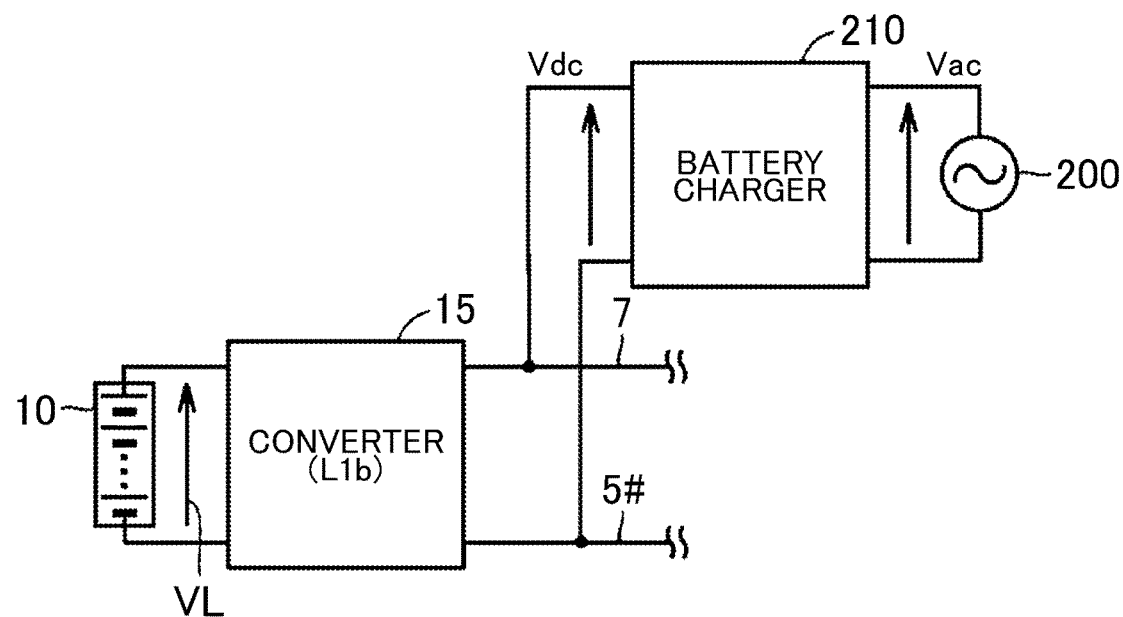
FIG. 5 is a block diagram explaining a configuration of external charging of a hybrid vehicle in which the electric power supply system according to the present embodiment is installed.

As a second example, in the case of configuring the main battery 10 to be chargeable with an external electric power supply of the vehicle (hereinafter, also referred to as an "external power supply"), specifically, configuring the hybrid vehicle 100 as a so-called plug-in hybrid vehicle, it is possible to effectively increase the temperature of the main battery 10 by employing a charging configuration as shown in FIG. 5. Hereinafter, charging of the main battery 10 by the external electric power supply is simply referred to as an "external charging".

FIG. 5 is a schematic block diagram explaining a configuration of externally charging the hybrid vehicle 100 to which the electric power supply system according to the present embodiment is applied.

With reference to FIG. 5, the hybrid vehicle 100 as shown in FIG. 1 further includes a battery charger 210 for the external charging.

The battery charger 210 converts an AC voltage Vac (e.g., 100 VAC or 200 VAC) from an external electric power supply 200 into a DC voltage Vdc, and outputs this between the electric power line 5 and the electric power line 7. For example, the battery charger 210 may be configured as an insulation-type AC/DC converter incorporating a transformer thereinside.

During the external charging, the converter 15 converts the DC voltage Vdc outputted from the battery charger 210 into a charging voltage of the main battery 10, and then outputs this between the electric power line 5 and the electric power line 6. Through this, it is possible to externally charge the main battery 10 with electric power from the external power supply 200.

During the external charging, current flows through the reactor of the converter 15 due to the voltage conversion. Hence, the reactor of the converter 15 is configured by using the reactor for temperature increasing L1$b$ (step S200 in FIG. 3), thereby using heat generated by the reactor of the converter 15 during the external charging for increasing the temperature of the main battery 10.

Meanwhile, if the main battery 10 is in the non-low temperature state during the external discharging, and thus no temperature increasing is required, in step S210 of FIG. 3, the reactor of the converter 15 may be configured by using the normal reactor L1a. Accordingly, it is possible to prevent the temperature of the main battery 10 from excessively becoming increased through the external discharging.

In this manner, according to the electric power supply system in accordance with the present embodiment, in the low temperature state of the main battery 10, the reactor for temperature increasing L1b so disposed as to form a heat transfer path between the reactor L1b and the main battery 10 may be used as the reactor of the converter 15. Consequently, during charging or discharging the main battery 10, not only the internal heat generated due to the passing current of the main battery 10 but also amount of heat generated by the current passing through the reactor of the converter 15 can be used for increasing the temperature of the main battery 10. Accordingly, it is possible to efficiently and rapidly increase the temperature of the main battery 10 in the low temperature state.

In addition, in the non-low temperature state of the main battery 10, the normal reactor L1a in the PCU 60 can be used as the reactor of the converter 15, thus preventing the temperature of the main battery 10 from being excessively increased.

It is preferable to design the reactor for temperature increasing L1b to have inductance equivalent to inductance of the normal reactor L1a. This configuration can stabilize the operation of the converter 15 before and after switching the usage between the reactor for temperature increasing L1b and the normal reactor L1a depending on the change in temperature state of the main battery 10.

Meanwhile, if the reactor for temperature increasing L1b is used only for increasing the temperature of the main battery 10, the inductance of the reactor for temperature increasing L1b may be set to be an optimum value for the temperature increasing, which may be different from the inductance of the normal reactor L1a. For example, as described in JP 2014-87081 A, the inductance of the reactor for temperature increasing L1b may be smaller than the inductance of the normal reactor L1a.

Variation of First Embodiment

In the variation of the first embodiment, a preferable arrangement structure of the reactor for temperature increasing L1b in the battery pack 80 will be described.

Figure 6:
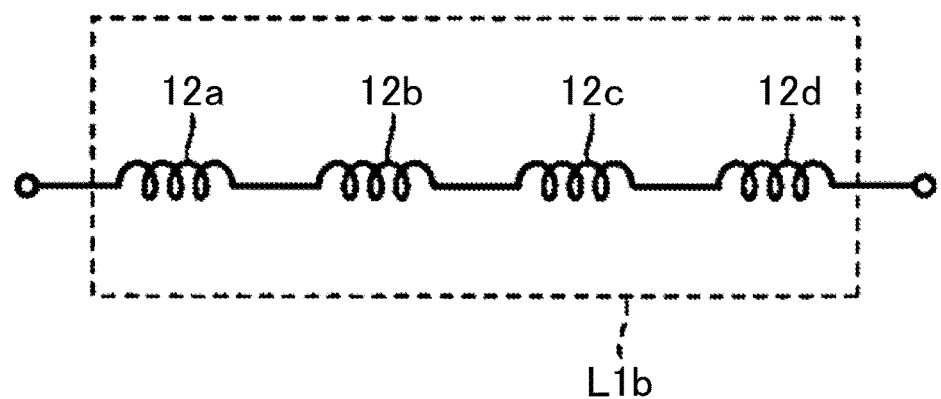
FIG. 6 is a circuit diagram of a reactor for temperature increasing.
Figure 7:
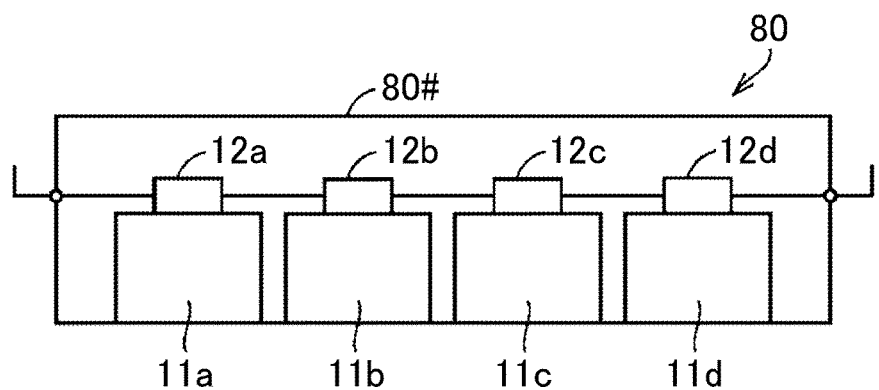
FIG. 7 is a block diagram conceptually explaining an arrangement manner of the reactor for temperature increasing in the battery pack.

FIG. 6 is a circuit diagram of the reactor for temperature increasing, and FIG. 7 is a block diagram conceptually explaining the arrangement manner of the reactor for temperature increasing in the battery pack.

With reference to FIG. 6 and FIG. 7, the reactor for temperature increasing L1b is configured by a plurality of reactor elements 12a to 12d connected in series. The main battery 10 is divided into a plurality of battery units 11a to 11d. Each of the battery units 11a to 11d is configured to include a plurality of battery cells (not shown) that are electrically connected. The battery units 11a to 11d are electrically connected to one another. For example, the main battery 10 is configured by the battery units 11a to 11d connected in series.

As shown in FIG. 7, the reactor elements 12a to 12d are so arranged as to correspond to the respective battery units 11a to 11d. For example, the reactor elements 12a to 12d are arranged in a manner as to be in physical contact with the corresponding battery units 11a to 11d. Specifically, the reactor elements 12a to 12d are arranged in a manner as to configure respective heat transfer paths between the reactor elements 12a to 12d and the corresponding battery units 11a to 11d.

Through this configuration, it is possible to equivalently deliver amount of heat generated by supplying current to the reactor for temperature increasing L1b to the battery cells separately arranged in the corresponding battery units 11a to 11d. Accordingly, during increasing the temperature of the main battery 10 by using the reactor for temperature increasing L1b, it is possible to reduce variation in temperature inside the main battery 10, specifically, among the battery cells configuring the main battery 10.

Figure 8:
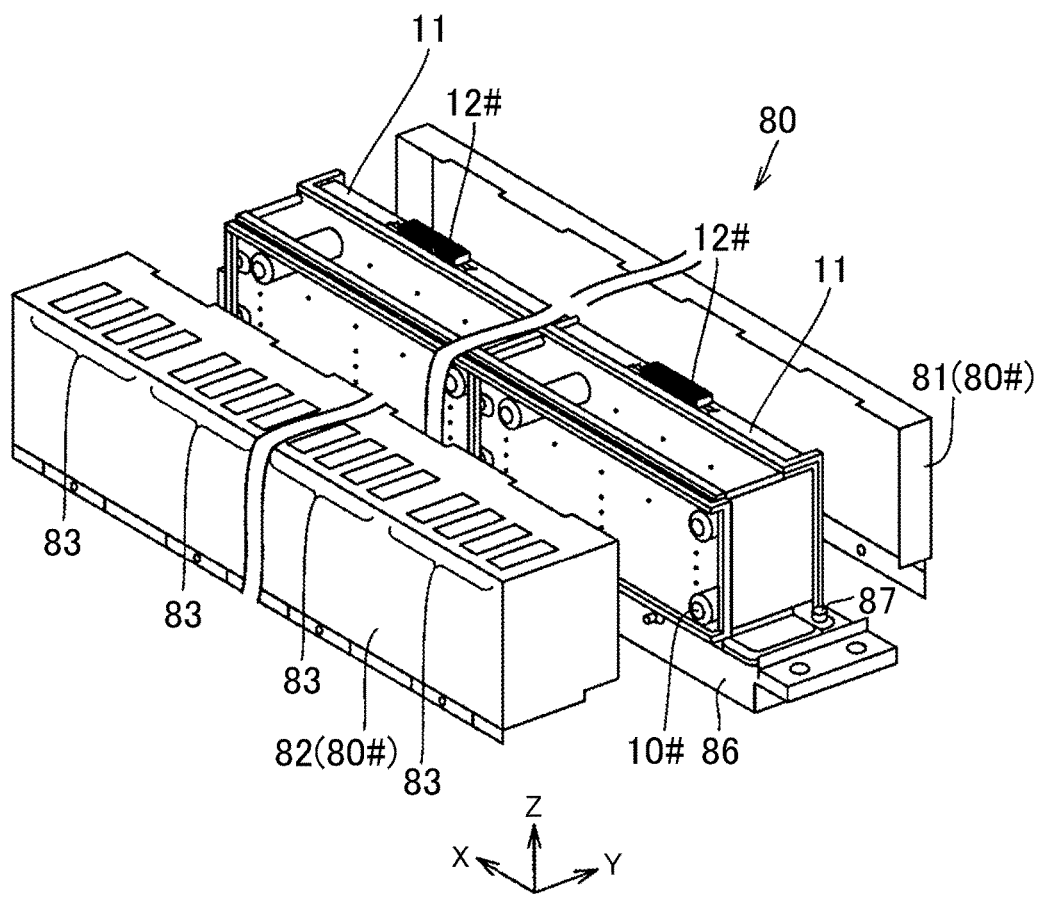
FIG. 8 is an explored perspective view explaining a structure of a battery pack incorporating a thermal diffusing plate thereinside.
Figure 9:
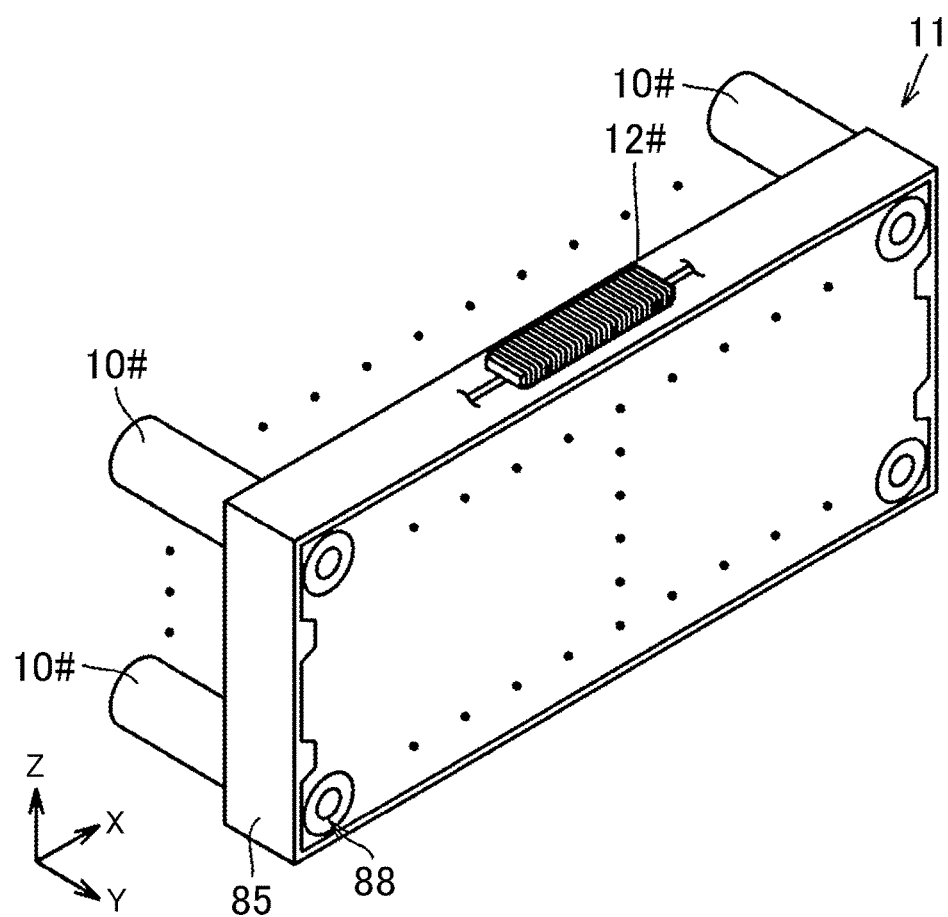
FIG. 9 is a perspective view of a single unit of the battery units in FIG. 8.

As shown in FIG. 8 and FIG. 9, a thermal diffusing plate may be incorporated in the battery pack so as to reduce variation in temperature inside the main battery.

FIG. 8 is an explored perspective view explaining the structure of the battery pack incorporating the thermal diffusing plate thereinside. FIG. 9 is a perspective view of a single unit of the battery units in FIG. 8. An X axis, a Y axis, and a Z axis are three axes orthogonal to one another, and are commonly used in FIG. 8 and FIG. 9.

With reference to FIG. 8, the battery pack 80 includes pack cases 81, 82 configuring a housing 80#, a fixing plate 86, and at least one battery unit 11. The battery unit 11 is configured as an assembly of cylindrical battery cells 10#. Herein, each battery cell 10# has a cylindrical shape. In FIG. 8 and FIG. 9, only some of the battery cells 10# configuring the battery unit 11 are schematically illustrated, but actually, any number of the battery cells 10# may be consecutively arranged.

In the battery unit 11, the battery cells 10# are electrically connected to one another. In the case of arranging the battery units 11, these battery units 11 are also electrically connected to one another. For example, the main battery 10 is configured by the battery units 11 connected in series.

The battery unit 11 is fixed to the fixing plate 86 with fastening bolts 87. The fixing plate 86 is fixed at an installation position of the battery pack 80. For example, the fixing plate 86 may be fixed to a bottom surface of the body 105 (FIG. 2).

In addition, the pack cases 81 and 82 are fixed to the fixing plate 86, so that the battery unit 11 is housed inside the housing 80#. Slits 83 are formed in the pack case 82 (housing 80#). The slits 83 secure thermal radiation paths of the battery cells 10# in a high temperature state.

With reference to FIG. 9, each battery unit 11 has the battery cells 10# fixed to the thermal diffusing plate 85 in a flat-plate shape. A plurality of fixing holes 88 used for fixing the cylindrical battery cells 10# are formed in the thermal diffusing plate 85. The battery cells 10# are fixedly fitted into the fixing holes 88 formed in an X-Z plane of the thermal diffusing plate 85.

In each battery unit 11, a reactor element 12# is fixed to the thermal diffusing plate 85. The reactor element 12# is so disposed as to have a heat transfer path between the reactor element 12# and the thermal diffusing plate 85. Each reactor element 12# disposed to each battery unit 11 is electrically connected, thereby configuring the reactor for temperature increasing L1b.

The thermal diffusing plate 85 may be configured by a solid metal (e.g., aluminum), for example. The solid metal denotes a metallic body of which inside is filled with metal so that there is no follow portion thereinside. The thermal diffusing plate 85 is configured by a solid metal, thereby delivering heat transferred from the reactor element 12# to the thermal diffusing plate 85 to each battery cell 10#.

Accordingly, it is possible to reduce variation in temperature among the battery cells 10# in each battery unit 11.

Figure 14:
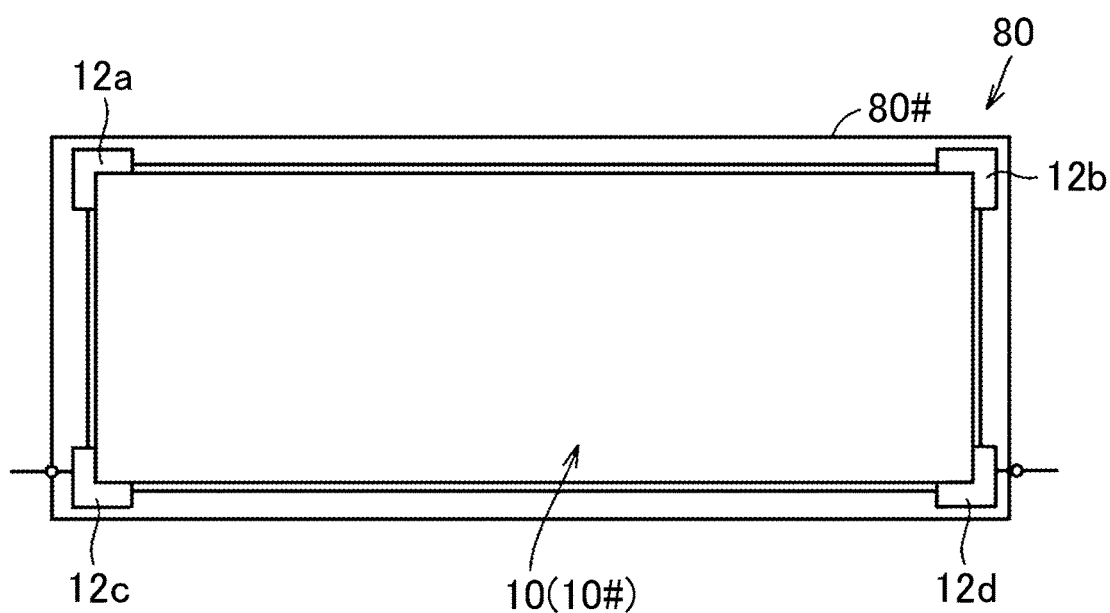
FIG. 14 is a block diagram conceptually explaining another example of an arrangement manner of the reactor for temperature increasing in the battery pack.

Alternatively, as shown in FIG. 14, in the housing 80#, the divided reactor elements 12a to 12d may be respectively disposed in a manner as to correspond to four corners of an assembly of the battery cells 10# that configures the main battery 10. As similar to FIG. 6, the reactor elements 12a to 12d are electrically connected in series, thereby configuring the reactor for temperature increasing L1b.

Through this arrangement, it is possible to preferentially provide amount of heat from the reactor for temperature increasing L1b to the battery cells having relatively greater amount of radiation because these battery cells are located at the four corners in the battery pack 80. As a result, it is possible to reduce variation in temperature among the battery cells configuring the main battery 10. In each configuration example including that of FIG. 14, the dividing number of the reactor elements required for dividedly arranging the reactor for temperature increasing L1b is not limited to four, and particularly, in the configuration example of FIG. 14, some of the reactor elements that are separately arranged may be disposed at the four corresponding corners of the battery pack 80.

As described in the variation of the first embodiment, the reactor for temperature increasing L1b is disposed, thereby suppressing variation in heat transfer from the reactor for temperature increasing L1b to the respective battery cells 10#. Accordingly, it is possible to suppress variation in temperature inside the main battery 10 during increasing the temperature of the main battery 10 by using the reactor for temperature increasing L1b.

Second Embodiment

In the following second and third embodiments, in addition to the reactor switching control in the first embodiment, a reactor switching control additionally carried out will be described. In the following embodiments, overlapping description regarding parts to which the same configurations and the same controls as those in the first embodiment are applied will be omitted.

Figure 10:
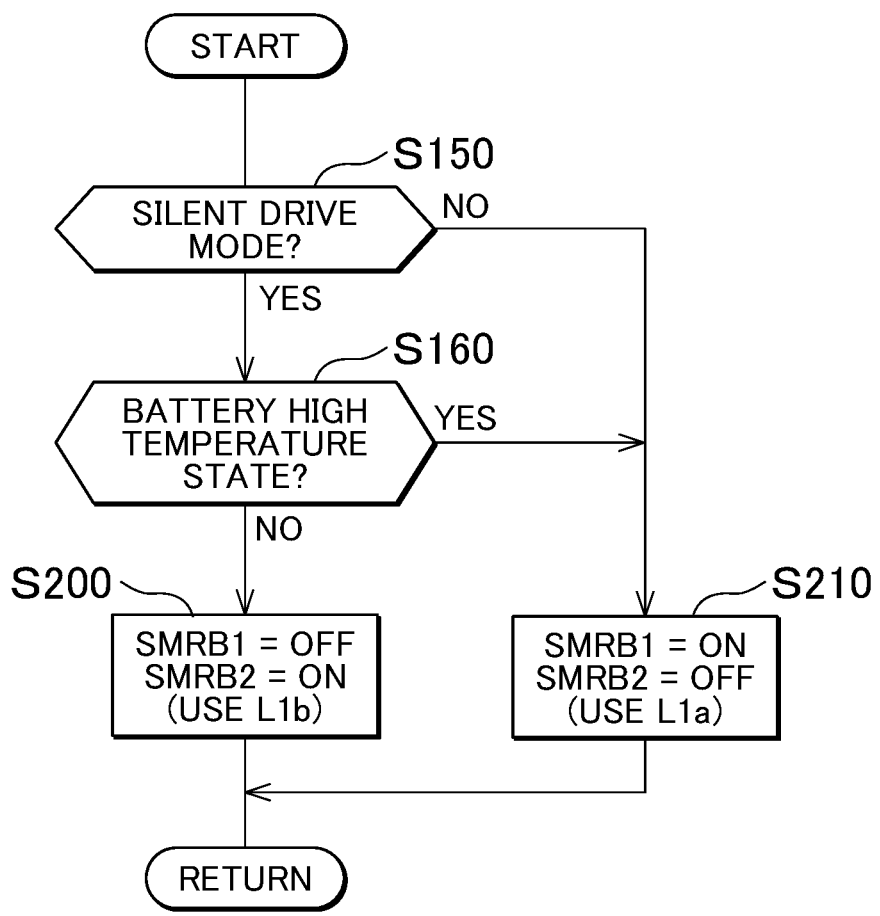
FIG. 10 is a flowchart explaining processing of a reactor switching control of the converter according to the second embodiment.

FIG. 10 is a flowchart showing control processing for reactor switching of the converter in the electric power supply system according to the second embodiment. The control processing in accordance with the flowchart as shown in FIG. 10 is repetitively carried out with predetermined time intervals if the main battery 10 is in a non-low temperature state (if NO is determined in S120 of FIG. 3).

With reference to FIG. 10, the control unit 50 determines whether or not the hybrid vehicle 100 is in a silent drive mode in step S150. In the present embodiment, the "silent drive mode" denotes a drive state in which silence is required for the hybrid vehicle 100. For example, while the EV-drive switch 75 (FIG. 1) is operated by the driver, the control unit 50 determines that the drive mode is the "silent drive mode". Alternatively, it may be configured that the "silent drive mode" is determined based on information regarding a current location in a navigation system when the vehicle drives in a residential quarter at midnight, or the like.

The control unit 50 advances the processing to step S160 if the mode is the silent drive mode (if YES is determined in S150) so as to determine whether or not the main battery 10 is in a high temperature state.

If the mode is the silent drive mode, and the main battery 10 is out of the high temperature state (if YES is determined in S160), the control unit 50 advances the processing to step S200, which is the same as that of FIG. 3. Through this, the reactor of the converter 15 is configured by the reactor for temperature increasing L1b disposed inside the battery pack 80.

To the contrary, if the mode is not the silent drive mode (if NO is determined in S150), or if the mode is the silent drive mode, but the main battery 10 is in a high temperature state (if YES is determined in S160), the control unit 50 advances the processing to step S210, which is the same as that of FIG. 3. Through this, the reactor of the converter is configured by using the normal reactor L1a disposed in the PCU 60.

The reactor of the converter 15 vibrates at a frequency deriving from periodical variations of an electromagnetic force due to flow of alternating current components at the ON-OFF frequency (carrier frequency) of the semiconductor devices Q1, Q2. Hence, it is concerned that vibration noises of the normal reactor L1a or the reactor for temperature increasing L1b are outputted to the outside of the vehicle while the hybrid vehicle 100 is traveling along with the voltage converting operation by the converter 15.

In the case of configuring the reactor of the converter 15 by using the normal reactor L1a, vibrations generated in the normal reactor L1a are transferred to the housing 60#. On the other hand, in the case of configuring the reactor of the converter 15 by using the reactor for temperature increasing L1b, vibrations generated in the reactor for temperature increasing L1b are transferred to the housing 80#.

Figure 11:
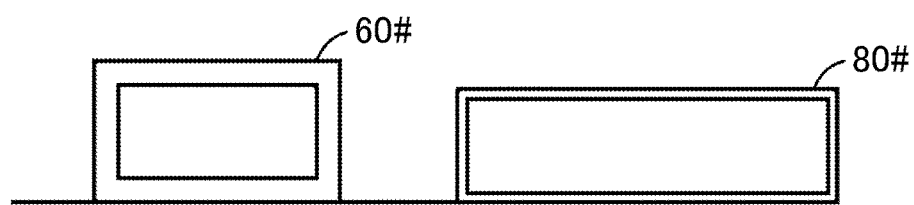
FIG. 11 is a conceptual diagram used for comparing housing shapes between a PCU and the battery pack.

FIG. 11 shows a conceptual diagram used for comparing the housing shape between the PCU 60 and the battery pack 80.

The normal reactor L1a is disposed inside the housing 60# that houses the PCU 60 thereinside. On the other hand, the reactor for temperature increasing L1b is disposed inside the housing 80# that houses the battery pack 80 thereinside.

The battery pack 80 has a relatively large capacity because the battery pack 80 is configured by an assembly of the battery cells 10#. Hence, the housing 80# has a relatively smaller height ratio relative to a bottom surface dimension. The housing 80# is usually formed by subjecting a relatively thin metal sheet to sheet-metal working.

On the other hand, the housing 60# of the PCU 60 has a greater height ratio relative to a bottom surface dimension, compared with that of the housing 80# of the battery pack 80. The housing 60# has a greater thickness than that of the housing 80# because the housing 60# is generally formed by a casting such as aluminum.

Differences in shape and thickness between the housing 60# and the housing 80# cause a difference in noise occurrence condition therebetween if vibrations are transferred from the normal reactor L1a to the housing 60#, and from the reactor for temperature increasing L1b to the housing 80#, respectively. Specifically, the housing 80# having a greater bottom area and a smaller thickness tends to have a lower noise frequency generated at the time of vibrations of the reactor compared with the case of the housing 60#. Hence, it is expected that vibration noises from the reactor for temperature increasing L1b housed in the housing 80# is more difficult to be perceived by people in the outside of the hybrid vehicle 100 than vibration noises from the normal reactor L1a housed in the housing 60#.

Figure 13:
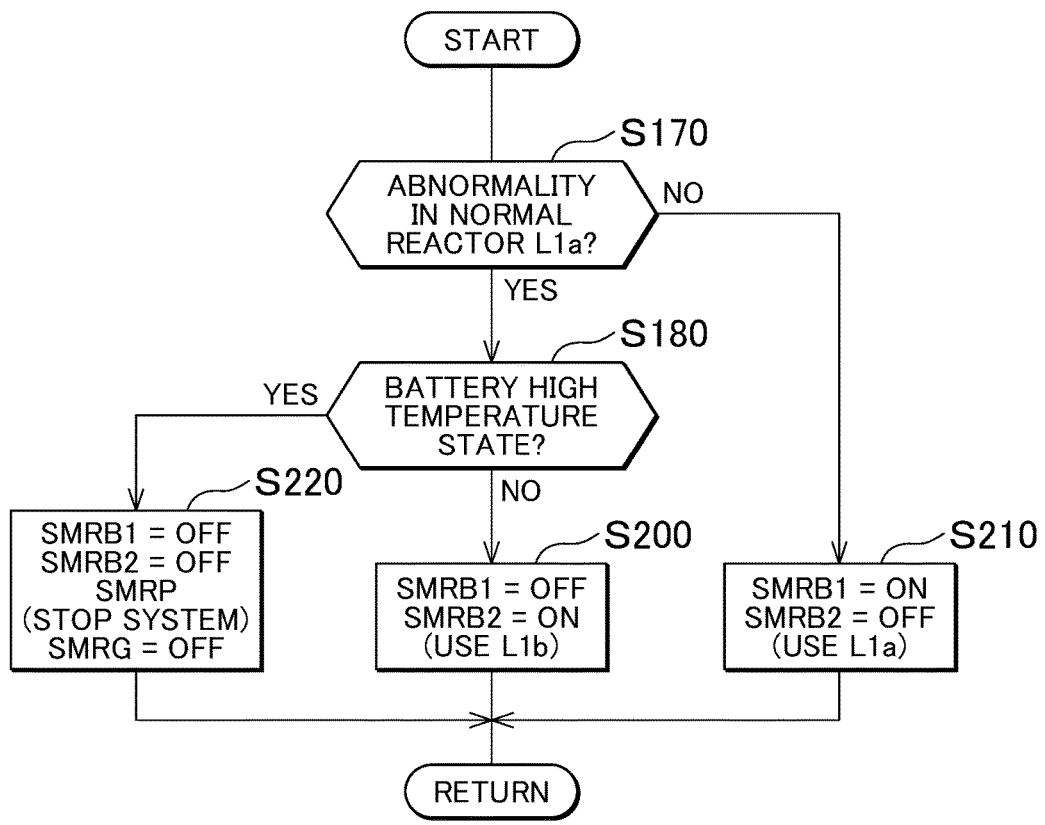
FIG. 13 a flowchart explaining processing of a reactor switching control of a converter according to the third embodiment.

Accordingly, as shown in FIG. 13, in the silent drive mode, it is preferable to use the reactor for temperature increasing L1b as the reactor of the converter 15 in light of noise sensitivity relative to the outside of the hybrid vehicle 100.

Figure 12:
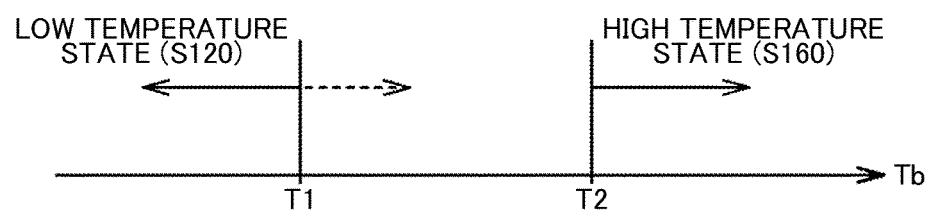
FIG. 12 is a conceptual diagram used for comparing temperature conditions of the main battery in the reactor switching control.

FIG. 12 shows a conceptual diagram used for comparing temperature conditions of the main battery in the reactor switching control.

With reference to FIG. 12, the "battery low temperature state" in step S120 of FIG. 3 is determined based on the comparison between the battery temperature Tb and a threshold value T1. Specifically, the "battery low temperature state" is determined if Tb<T1; and otherwise (Tb≥T1), the "battery non-low temperature state" is determined.

On the other hand, the "battery high temperature state" in step S160 of FIG. 10 is determined based on the comparison between the battery temperature Tb and a threshold value T2. Specifically, the "battery high temperature state" is determined if Tb>T2. Herein, the threshold values are defined to be T2>T1. Specifically, a temperature region determined as the "battery high temperature state" (Tb>T2) is a higher-temperature part of a temperature region determined as the "battery non-low temperature state" (Tb≥T1).

Hence, according to the reactor switching control of the second embodiment, in the temperature region of Tb≥T1 (battery non-low temperature state), in the silent drive mode, the reactor for temperature increasing L1b is used instead of using the normal reactor L1a, thereby making noises deriving from the vibrations of the reactor of the converter 15 hard to be perceived from the outside of the vehicle.

On the other hand, in the temperature region of Tb>T2 (battery high temperature state) for the case of increase in temperature of the main battery 10, the normal reactor L1a is used so as to stop current supply to the reactor for temperature increasing L1b. Accordingly, it is possible to protect the main battery 10 from an excessively high temperature.

In this manner, according to the hybrid vehicle to which the reactor switching control according to the second embodiment is applied, along with the effects of the first embodiment, while preventing excessive increase in temperature of the main battery 10, it is possible to reduce noises deriving from vibrations of the reactor of the converter 15 toward the outside of the vehicle.

Third Embodiment

FIG. 13 is a flowchart explaining the witching processing of the reactor of the converter 15 according to the third embodiment. The control processing according to the flowchart as shown in FIG. 13 is repetitively executed with predetermined time intervals in the non-low temperature state of the main battery 10 (if NO is determined in S120 of FIG. 3).

With reference to FIG. 13, in step S170, the control unit 50 determines whether or not any abnormality occurs in the normal reactor L1a. The determination in step S170 may be carried out based on a diagnostic code for the hybrid vehicle 100.

At the time of abnormality in the normal reactor L1a, the control unit 50 advances the processing to step S180 to determine whether or not the main battery 10 is in a high temperature state. The determination in step S180 can be executed in the same manner as that in step S160 of FIG. 10.

If abnormality occurs in the normal reactor L1a, and the main battery 10 is not in the high temperature state (if NO is determined in S180), the control unit 50 advances the processing to step S200, which is the same as that in FIG. 3, so as to configure the reactor of the converter 15 by using the reactor for temperature increasing L1b.

Through this, instead of the normal reactor L1a having abnormality, the reactor for temperature increasing L1b can be used so as to operate the converter 15. Accordingly, it is possible to maintain the drive of the hybrid vehicle 100 even if abnormality occurs in the normal reactor L1a.

To the contrary, no abnormality occurs in the normal reactor L1a (if NO is determined in S170), the control unit 50 advances the processing to step S210 to configure the reactor of the converter 15 by using the normal reactor L1a. Through this, in order to prevent unnecessary increase in temperature of the main battery 10, the converter 15 executes voltage conversion for the vehicle drive by using the reactor L1a.

If abnormality occurs in the normal reactor L1a, and the main battery 10 is in the high temperature state (if YES is determined in S180), the control unit 50 advances the processing to step S220. In step S220, the control unit 50 turns off the relays SMRB1, SMRB2, SMRP, and SMRG. This means that the electric power supply by the power supply system 101 is stopped.

Through this, if abnormality occurs in the normal reactor L1a, and if the reactor for temperature increasing L1b cannot be used due to the temperature state of the main battery 10, the drive of the hybrid vehicle 100 is prohibited. Furthermore, it is preferable to output a message for prompting the driver to repair the vehicle.

In this manner, in the electric power supply system according to the third embodiment, the reactor for temperature increasing L1b disposed inside the battery pack 80 is used as a substitute for the normal reactor L1a, thereby maintaining the operation of the electric power supply system even if abnormality occurs in the reactor L1a. Meanwhile, in the battery high temperature state, the usage of the reactor for temperature increasing L1b is prohibited, thereby preventing the temperature of the main battery 10 from becoming excessively high.

In the second and third embodiments, in the non-low temperature state of the main battery 10, the normal reactor L1a and the reactor for temperature increasing L1b are selectively used in the converter 15. Accordingly, it is preferable to design the reactor L1a and the reactor for temperature increasing L1b to have equal inductance.

In the present embodiment, it has been explained that the main battery 10 configured by a secondary battery is configured as an "electric power storage apparatus", but any battery other than a secondary battery may be applicable as far as the main battery 10 is an electric power storage apparatus requiring temperature increasing in a low temperature state.

As an application example of the electric power supply system according to the present embodiment, the hybrid vehicle is exemplified, but the configuration of the hybrid vehicle is not limited to the exemplification of FIG. 1. In addition, excluding the second embodiment to which the control depending on the drive mode is applied, the present invention is commonly applicable to a configuration equipped with a converter including reactors even if the configuration is a configuration of an electric power supply system that supplies electric power from an electric power storage apparatus to an electric load of any other than a hybrid vehicle.

It should be considered that the embodiments disclosed herein are all exemplifications, and are not restrictive. The scope of the present invention is not defined by the above description, but by the scope of the claims, and includes everything equivalent in meaning to the scope of the claims and all modifications therein.

What is claimed is:

1. An electric power supply system comprising:
an electric power storage apparatus;
a detector configured to detect a temperature of the electric power storage apparatus;
a converter connected between the electric power storage apparatus and a load, the converter including a first reactor and switching elements;
a first switch electrically connected to the first reactor in series relative to the electric power storage apparatus;
a second reactor so disposed as to have a heat transfer path between the second reactor and the electric power storage apparatus;
a second switch electrically connected to the second reactor in series relative to the electric power storage apparatus; and
an electronic controller configured to control the converter, the first switch, and the second switch,
wherein
the second reactor and the second switch are electrically connected to the first reactor and the first switch in parallel,
and
based on an output from the detector, the electronic controller is configured to close the second switch and open the first switch in a low temperature state of the electric power storage apparatus, wherein the electric power storage apparatus is in the low temperature state when the temperature of the electric power storage apparatus is lower than a first threshold temperature,
wherein the second reactor is disposed in a housing that houses the electric power storage apparatus inside,
the electric power supply system is installed in a hybrid vehicle equipped with an engine and a motor, and
the electronic controller is configured to close the second switch, and open the first switch in a drive condition in which silence is required for the hybrid vehicle.

2. The electric power supply system according to claim 1, wherein
the electric power storage apparatus is charged via a current path including the converter when the electric power storage apparatus is charged by electric power from an electric power supply in an outside of the hybrid vehicle.

3. The electric power supply system according to claim 1, wherein
in the low temperature state of the electric power storage apparatus, the electronic controller is configured to control ON-OFF of the switching elements of the converter in such a manner that charge or discharge current of the electric power storage apparatus becomes alternating current having an average value of zero.

4. The electric power supply system according to claim 1, wherein
even in the drive condition in which the silence is required for the hybrid vehicle, the electronic controller is configured to close the first switch, and open the second switch when the electric power storage apparatus is in a high temperature state, wherein the electric power storage apparatus is in the high temperature state when the temperature of the electric power storage apparatus is higher than a second threshold value.

5. The electric power supply system according to claim 1, wherein during drive of the hybrid vehicle, when abnormality occurs in the first reactor, the electronic controller is configured to close the second switch, and open the first switch in the low temperature state of the electric power storage apparatus.

6. The electric power supply system according to claim 5, wherein
even when the abnormality occurs in the first reactor, the electronic controller is configured to close the first switch, and open the second switch in the high temperature state of the electric power storage apparatus.

7. The electric power supply system according to claim 1, wherein
the electric power storage apparatus includes a plurality of battery cells each of which has a cylindrical shape,
the plurality of battery cells are fixed into a plurality of holes formed in a thermal diffusing plate in a flat-plate shape, and
the second reactor is so disposed as to have a heat transfer path between the second reactor and the thermal diffusing plate.

8. The electric power supply system according to claim 1, wherein
the electric power storage apparatus includes a plurality of battery cells that are separately arranged in a plurality of electric-power-storage-apparatus units,
the second reactor includes a plurality of reactor elements connected in series, and
the plurality of reactor elements are so arranged as to have respective heat transfer paths between the plurality of reactor elements and the plurality of electric-power-storage-apparatus units.

9. The electric power supply system according to claim 1, wherein the first reactor and the second reactor have an equal inductance.

* * * * *